US011274513B2

(12) United States Patent
Angelis

(10) Patent No.: US 11,274,513 B2
(45) Date of Patent: Mar. 15, 2022

(54) DOWNHOLE DEVICE FOR USE IN A WELL

(71) Applicant: G A R&D Limited, Aberdeen (GB)

(72) Inventor: Yerasimos Angelis, Aberdeen (GB)

(73) Assignee: G A R&D Limited, Aberdeen (GB)

( * ) Notice: Subject to any disclaimer, the term of this patent is extended or adjusted under 35 U.S.C. 154(b) by 0 days.

(21) Appl. No.: 16/651,585

(22) PCT Filed: Oct. 3, 2018

(86) PCT No.: PCT/GB2018/052816
§ 371 (c)(1),
(2) Date: Mar. 27, 2020

(87) PCT Pub. No.: WO2019/069073
PCT Pub. Date: Apr. 11, 2019

(65) Prior Publication Data
US 2020/0256162 A1  Aug. 13, 2020

(30) Foreign Application Priority Data
Oct. 3, 2017  (GB) ..................... 1716138

(51) Int. Cl.
E21B 23/14 (2006.01)
E21B 17/10 (2006.01)
E21B 41/00 (2006.01)

(52) U.S. Cl.
CPC .......... *E21B 23/14* (2013.01); *E21B 17/1057* (2013.01); *E21B 41/00* (2013.01)

(58) Field of Classification Search
CPC ...... E21B 41/00; E21B 17/1057; E21B 23/14; B60Y 2200/60; B60B 37/10
See application file for complete search history.

(56) References Cited

U.S. PATENT DOCUMENTS

| 1,827,835 | A | * | 10/1931 | Black | E21B 17/1057 166/241.3 |
| 4,919,205 | A | * | 4/1990 | Dollison | E21B 17/1057 166/241.3 |
| 2007/0151768 | A1 | | 7/2007 | Kennedy | |
| 2009/0003974 | A1 | * | 1/2009 | McNay | E21B 17/1057 414/22.51 |
| 2012/0145380 | A1 | * | 6/2012 | Draper | E21B 17/05 166/241.3 |

(Continued)

FOREIGN PATENT DOCUMENTS

| CA | 1231866 A | 1/1988 |
| DE | 102014017429 A1 | 5/2015 |

(Continued)

*Primary Examiner* — Brad Harcourt
(74) *Attorney, Agent, or Firm* — Dorton & Willis, LLP; Ryan Willis

(57) ABSTRACT

A downhole device (15) comprising: a body (10) with a bore; at least one wheel (20) or other retained component; an engagement member (40) for engaging the wheel with the body. A retaining member (31) retains the engagement member (40) in place, the retaining member (31) extending along the body (10) and in the line of the main axis of the engagement member (40) so that it abuts. Embodiments allow for more convenient and more reliable retaining of wheels or other components in the device especially reducing the need for using threaded connections, which are prone to failure.

22 Claims, 8 Drawing Sheets

(56) References Cited

U.S. PATENT DOCUMENTS

2015/0144327 A1    5/2015  Millet et al.
2015/0308207 A1   10/2015  Mccormick
2018/0135359 A1*  5/2018  Hradecky ........... E21B 17/1057

FOREIGN PATENT DOCUMENTS

| GB | 2460129 A | 11/2009 |
|----|-----------|---------|
| GB | 2547471 A | 8/2017 |
| GB | 2562323 A | 11/2018 |
| WO | 2019069073 A1 | 2/2017 |

* cited by examiner

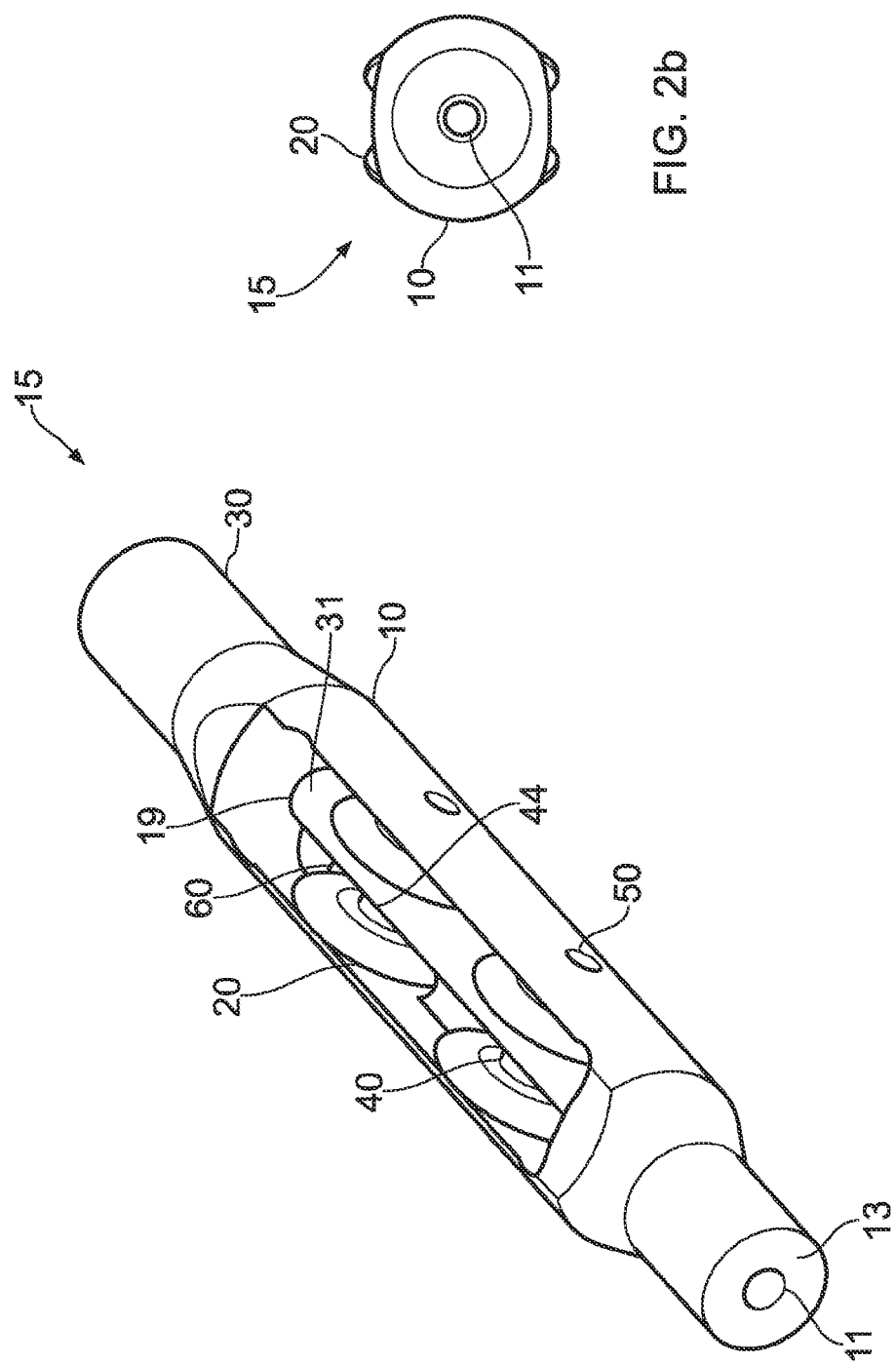

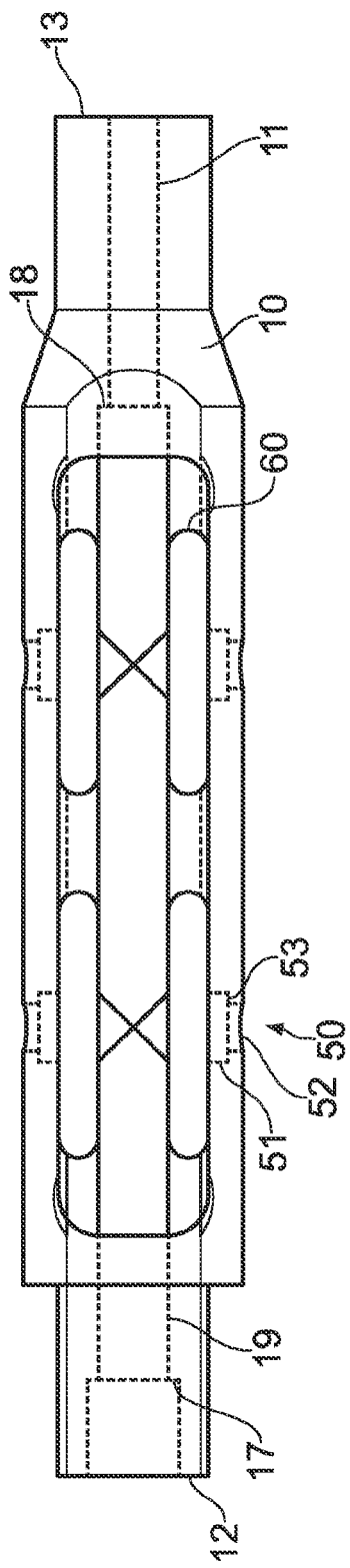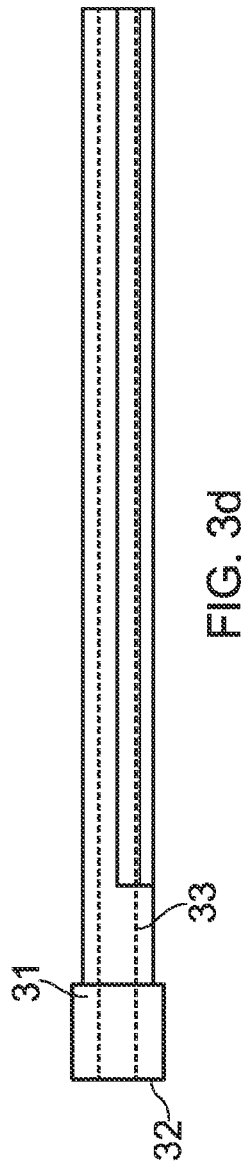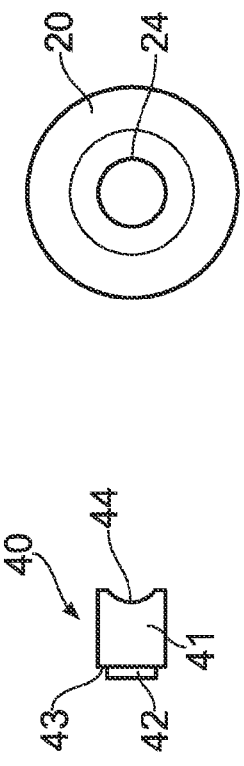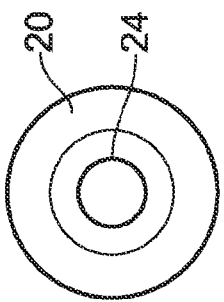
FIG. 3c
FIG. 3d
FIG. 3a
FIG. 3b

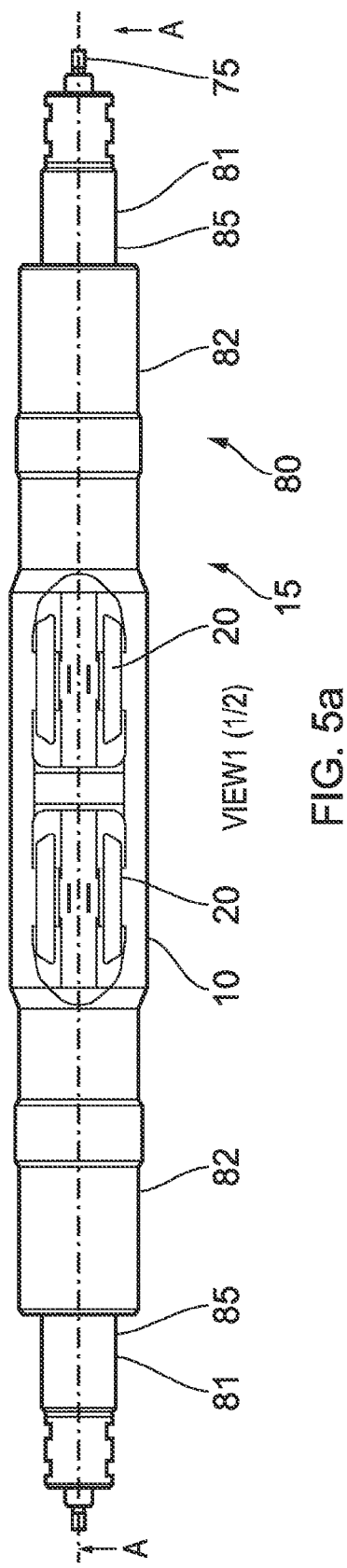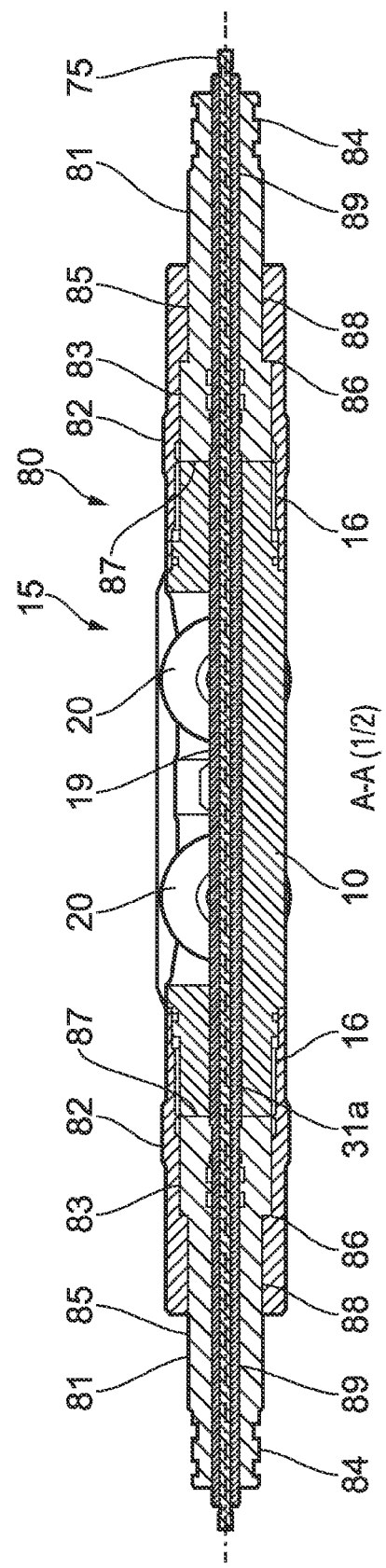
FIG. 5a
FIG. 5b

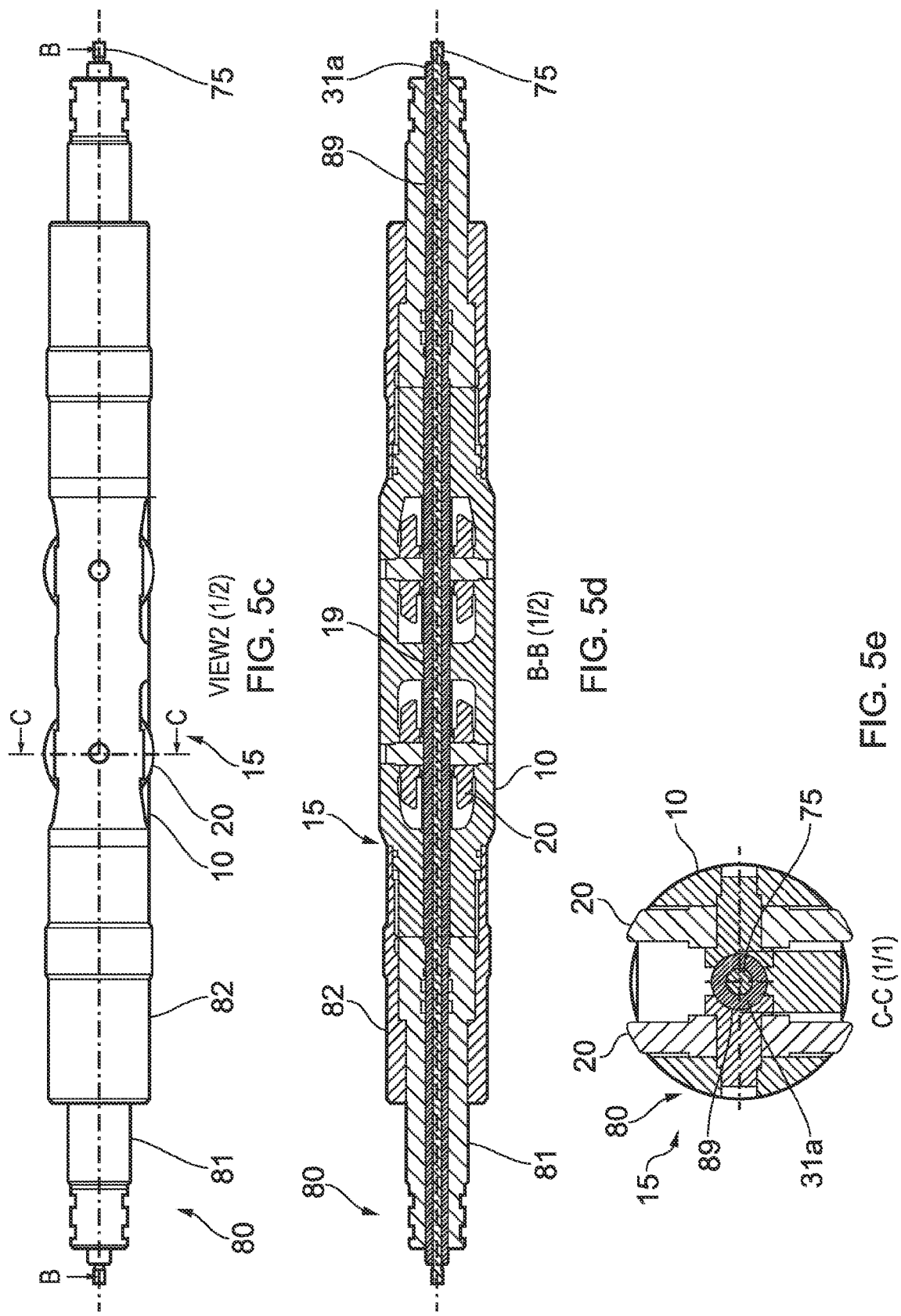

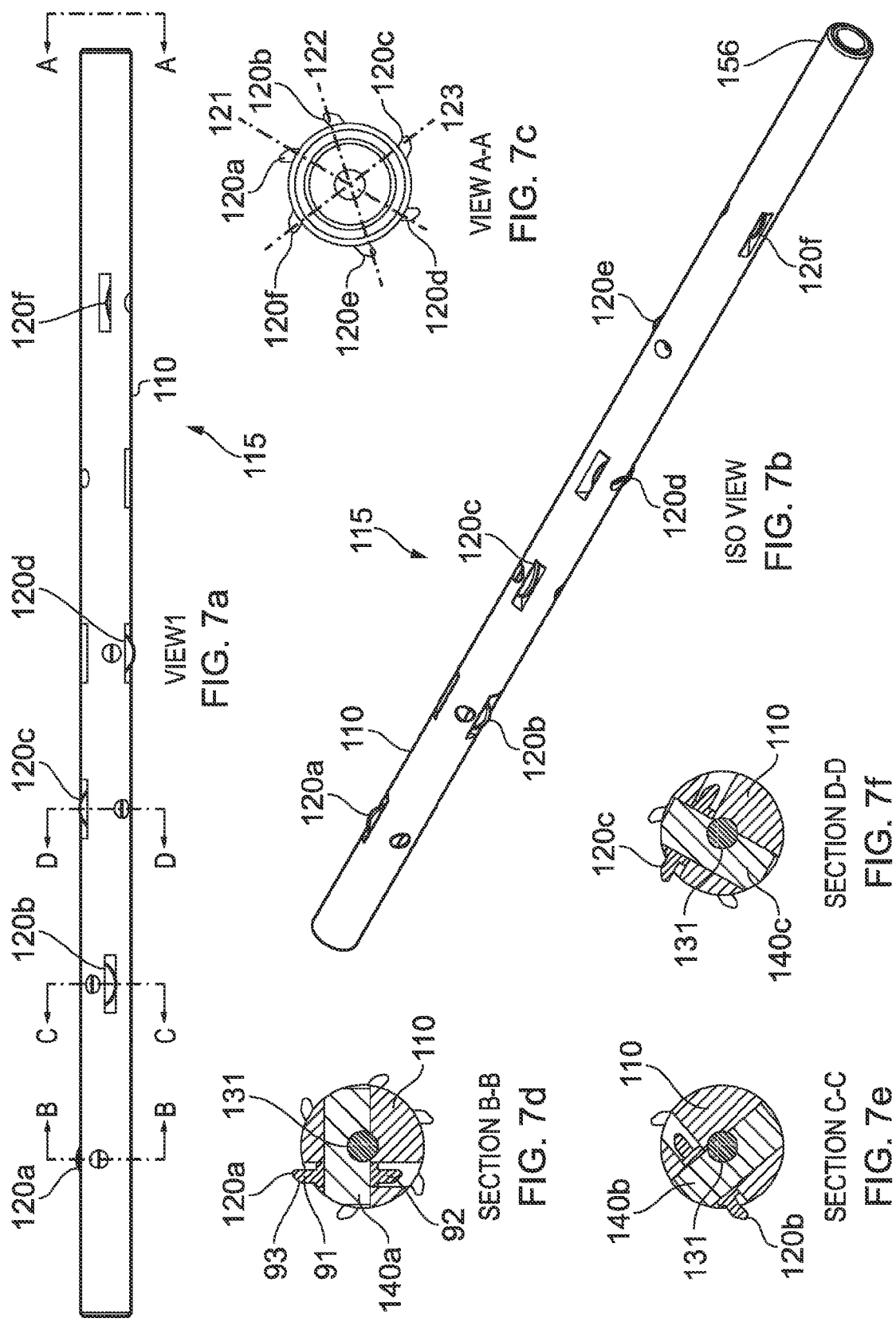

DOWNHOLE DEVICE FOR USE IN A WELL

The present invention relates to a downhole device for use in a well, especially a roller device for deployment as part of a string run into a wellbore.

Tools can be deployed "run in" to wellbores, often oil and gas wells, for a whole variety of purposes. The tools can be run in on electric line, slick line, coiled tubing, micro coiled tubing, fibre optic or various other deployment methods.

In recent years, deviated and sometimes horizontal wellbores have become increasingly more prevalent. Accordingly, a string comprising the tool will have more contact with the side of the well or the tubular through which it is run. For example, it may come into contact with the borehole, casing or production tubing, depending on the nature of the well.

It is known to provide roller devices on the string when deployed into a borehole. The borehole can be partially or fully cased, or may be openhole. Therefore, the string may be deployed through the borehole, with or without casing, optionally through another tubular, such as production tubing. Should the string contact the borehole or outer tubular, wheels extending radially from the roller device will contact the borehole or outer tubular. This reduces friction caused by contact between the tool string and the borehole/outer tubular and also serves to space the large part of the string and tool away from the borehole outer tubular.

A number of roller devices are on the market and are generally satisfactory. One example is described in GB2460129.

Roller devices may also be used as part of a centraliser for an oil well sucker rod guide in a reciprocating pump. One example is described in CA 1 231 866.

In the known devices, the wheels are generally attached to eyelets via a pin threadably secured in the eyelets and threaded through an axial aperture provided into the wheels. They are then secured with the appropriate amount of torque.

According to the present invention, there is provided a roller device comprising:
  a body;
  at least one wheel;
  an engagement member for engaging the at least one wheel with the body such that an axis of rotation of the wheel is defined;
  a retaining member for retaining the engagement member, the retaining member being moveable from a release position to a retaining position;
  wherein in the retaining position, the retaining member is provided in line with said axis, such that the engagement member abuts with the retaining member so that it obstructs and resists movement of the engagement member along the axis.

Embodiments of the invention benefit from a number of advantages. The engagement members do not need to be threadably engaged or correctly torqued to attach the wheel(s). The wellbore environment usually has high pressures and temperatures and in deploying a string considerable vibration occurs and such harsh environments can result in significant wear of the devices and threads for wheels. However, embodiments of the present invention do not require threads on an outer body to mount the wheel(s). Moreover, the optimum torquing of the screws to secure the wheels is also obviated, thus avoiding a potential mistake by field personal in torquing the screws appropriately. Moreover, the device with an engaging member and retaining member is more secure and so the risk of the screw unwinding and falling into the well potentially with the wheel is at least mitigated. Further, the device of certain embodiments is more robust and does not need replacing or servicing so often because there are fewer threads to be damaged and redressed.

The body of the roller device preferably has a bore. In the retaining position, the retaining member preferably extends through the body bore, typically along a longitudinal axis of the body.

Thus, preferred embodiments have the engagement member is at right angles to the main longitudinal axis of the body, and/or at right angles to the main axis of the retaining member. Similarly, the retaining member is ideally parallel to the axis running through the main body. Nevertheless it is not necessary to be exact, and some tolerance to such angles can still be useful. Thus the engagement member may be at an angle of 50 to 130 degrees to the main axis of the body and/or the retaining member, preferably 70 to 110 degrees. The retaining member may be +/−40 degrees to the main axis of the body, preferably +/−20 degrees.

The retaining member is optionally a retaining bar.

Typically, the at least one wheel extends, at least in part, radially outside of the body. Therefore, contact with an outer tubular/casing in use is more likely to contact the wheel rather than other parts of the roller device or string.

The axis of rotation of the wheel may be off-centre in the body, and sized such that a first portion of the outer circumference of the wheel extends radially outside of the body and a second portion of the outer circumference of the wheel is within the body.

The outer rim of the wheel may be tapered in the direction of the outer circumference of the body in order to present a larger contact surface to the outer casing or wellbore in use.

The wheel(s) typically define an aperture in their centre to receive the engagement member.

Whilst embodiments often involve retaining wheel(s) to a roller device, the same arrangement can be used to retain other components to downhole devices (not just roller devices) especially where facilitating conveyance is less important. This can also avoid or reduce the use of screws or traditional fasteners from such tools. For example, sensors, gauges or cutters may be retained in this way. An aspect of the invention provides for this. With the wheel option, such components are collectively referred to as "retained components" and the roller device more generally referred to as a downhole device.

There may be at least two retained components per roller device, or at least six. There may be up to and including eight retained components per roller device or up to twelve or up to sixteen or more. The retained components are optionally longitudinally spaced along the roller body. The retained components may be provided in pairs, and typically longitudinally spaced-apart pairs.

The retained component which forms one of a pair is may be located on the same plane as the retained component which forms the second of the pair. There may be one plane for each retained component or each pair. Each plane can intersect the centre point of the roller device, when viewed from an end, and extends radially outward therefrom in both directions. Each retained component or pair of retained components may be located on a different plane from the other pair(s) of retained components. The retained components or pairs may therefore be angularly spaced apart from each other, for example, by at least 30, 60, or 90 degrees. The retained components or pairs of retained components and/or planes are may be offset from each other by a constant angle, and they may be equiangularly spaced around the roller body, such as around the circumference of the roller body.

A locking mechanism may be provided to lock the retaining member in the retaining position. This may include a bracket mounted in the body, a circlip, further engagement members on an opposite side of the retaining member, a threaded connection, a locking sub engaged on an end of the body, and/or other locking devices.

Thus, certain embodiments include a locking sub engaged on an end of the body, which locks the retaining member in place. This may be threadably engaged with the body. However, a thread between the locking sub and the body is not as critical to torque optimally compared to threads between engagement members and the body to mount retained components, the latter of which is not necessary for embodiments of the present invention.

The engagement member may be in the form of a short rod or pin. When the retained component is a wheel, typically the axis of rotation of the wheel is the main axis of the engagement member. The rod engages or abuts with the retaining member, and normally it has a complementary shape to facilitate this, for example on an end thereof. This may be concave-shaped to engage with an outer face of a cylindrical retaining member. Or it may be flat if the retaining member has a, for example, square cross-section. Abutting with the engagement member with the retaining member can also resist rotation of the engagement member and such embodiments can benefit in that they suffer from less wear.

The engagement member may engage with a complementary socket on the body. It may have an end with a step-wise reduced thickness, essentially a smaller diameter boss extending from an end thereof. For certain embodiments, the socket on the body may comprise counter-sunk holes and the engagement member may engage with the counter-sunk holes such that the boss extends into the smaller of the counter-sunk holes and a portion of the remainder of the engagement member engages with the larger of the counter sunk holes.

In alternative embodiments, the engagement member may comprise a plate.

Between the retaining member and the body, the engagement member mounts the retained component. The retaining member can normally also be moved also from the retaining position to the release position.

For certain embodiments, the roller device can be run in on electric wireline, slick line, coiled tubing, micro coiled tubing, fibre optic or various other deployment methods. The roller device especially the retaining member may be adapted to transmit or facilitate transmission power and/or communications. The retaining member may be connected to an electric line and so provide power and/or communications from above the roller device to below the roller device, such as from surface to the tool below. (For horizontal wells, above/below should be construed as closer to the surface through the well/further from the surface through the well).

Certain embodiments facilitate said transmission by providing a hollow retaining member through which an electric line may extend. A hollow retaining member also allows a line to extend through the roller device for other purposes, such as to hold a tool below, or for hydraulics to be connected.

In an alternative embodiment of the present invention, the roller device may be used as a centraliser for a reciprocating sucker rod of a pump. Thus, the roller device of such embodiments can connect to an elongate sucker rod. If more than one wheel is provided, these are optionally located at different angulations around the roller body.

For such embodiments, the retaining member does not need to have a bore. The retaining member may be locked in the roller body by abutment with at least one adjacent rod, which is optionally connected to at least one end of the roller body. Typically the retaining member is locked in the roller body by abutment with two adjacent rods, with an adjacent rod connected at either end of the roller body.

The body may be rotatably disposed with respect to the retaining member. In this way, the downhole device can incorporate a swivel functionality to mitigate twisting in use, such as twisting of an e-line extending through the retaining member. 'Rotatably disposed' does to require complete 360 degree rotation and may indeed be much less.

A cap may be provided to connect the body to a rotatably disposed swivel pin, the swivel pin being provided on an end of the body, in line with the main axis of the body.

The cap is normally rotatably disposed with respect to one of the body and the swivel pin, and rigidly connected to the other. In one embodiment it is rigidly (normally threadably) connected to the body, and rotatably disposed with respect to the swivel pin.

The swivel pin normally has a bore, in line with any bore of the retaining member.

The swivel pin typically has a relatively smaller-diameter portion, optionally a shaft portion, and a relatively larger-diameter portion, optionally a head portion. A step is optionally formed between the respective portions. The pin is optionally connected to the roller device using the elongated cap.

The housing bore may have a graduated diameter. An inner shoulder is typically formed between the different diameter portions of the housing bore. Optionally, a larger-diameter portion of the housing bore has a similar diameter as the larger-diameter portion of the outside of the pin, and optionally a smaller-diameter portion of the housing bore has a similar diameter as the smaller-diameter portion of the outside of the pin.

A small cavity is optionally formed between the bore of the elongated cap and the outside of the swivel pin and/or between an end of the roller body and an end of the swivel pin. The cavity normally facilitates rotation of the elongated cap and/or the roller body with respect to the swivel pin. The cavity is typically filled with fluid, such as lubricating fluid, which may mitigate any frictional force acting against the relative rotational movement of the elongated cap and/or the roller body with respect to the swivel pin. Seals may be provided in the swivel pin bore to seal against the outside of the retaining bar, optionally forming a fluid-tight connection between the pin and the bar.

When the roller device swivel assembly is assembled, the swivel pin typically passes through the elongated cap and/or the elongated cap typically partially encases the swivel pin. The step of the swivel pin typically abuts with the inner shoulder of the elongated cap which limits and/or substantially prevents the swivel pin from moving axially away from the roller body.

The elongated cap is optionally affixed to the roller body by a threaded connection such that relative movement between the roller body and the elongated cap is prevented during normal use. The swivel pin is optionally rotatably held to the roller body by the elongated cap, optionally such that the bore of the swivel pin is kept substantially aligned with the bore through the roller body. A continuous path is optionally formed through the roller device swivel assembly, through which the retaining bar and e-line may pass.

An outer end of the swivel pin optionally extends past the elongated cap. The outer end of the swivel pin is optionally affixed to a coupling, optionally for connection with the toolstring. Alternatively, the swivel pins can be connected to a further downhole tool, either directly or with a coupling.

One or more of the roller device swivel assemblies may be run into a well on a string. A plurality of the roller device swivel assemblies may be spaced apart along the string, and/or they may be provided adjacent to each other on the string.

Such a swivel assembly, comprising the swivel pin, elongated cap and rotatable functionality described above may be provided at each end of the downhole device.

The retained component(s) of the roller device may be interchangeable, and the same body and engagement members may be used with retained components of different outer diameters depending on the operating conditions and environment where the roller device is run, e.g. openhole well, cased section of well, etc. For example, a set of wheels of a larger diameter may be used in a larger bore, allowing more traction for that particular bore or tubular size. For example, if the roller device is run into tubular, it may have a diameter of 2⅜ inches (6 cm approx.) or up to and beyond 4½ inches (11 cm approx.).

The downhole device described herein may be part of a downhole tool used for other purposes, such as a logging tool, a completion tool, a perforating gun, or any other downhole tool. Thus, the functionality described here and other functionality may be combined in one tool. Alternatively, they may be separate tools provided in the same string.

According to a further aspect of the invention there is provided a string for deployment into a borehole, comprising at least one downhole device as described herein.

A yet further aspect provides a method of deploying a string downhole comprising a downhole device as described herein.

The string normally comprises the downhole device and a downhole tool. It may comprise a plurality of (especially) roller devices, such as three or more. The roller devices may be on the same bottom hole assembly, or may be spaced apart along wireline etc. by at least 20 m, optionally at least 40 m.

The tool may be, for example, a kick over tool, a reamer or a mechanical jar.

The invention also provides a method of assembling the downhole device comprising:
  providing at least one retained component and a body with at least one socket;
  engaging an engagement member with the at least one retained component and engaging it in the socket of the body,
moving a retaining member from a release position to a retaining position, to abut with the engagement member and block and resist axial and rotational movement of the engagement member.

Where the retained component is a wheel, the method of assembling the roller device may comprise:
  providing at least one retained component with an aperture defined therein and a body with at least one socket;
  threading an engagement member through the aperture of the retained component and engaging it in the socket of the body,
  moving a retaining member from a release position to a retaining position, to abut with the engagement member and block and resist axial movement and rotation of the engagement member.

An advantage of certain embodiments is that the downhole device may be assembled and disassembled without any specialist tools.

Besides oil and gas wells, the embodiments of the present invention may be used in water wells, geothermal wells, and other pipe-like structures including drains.

Embodiments of the invention will now be described by way of example only and with reference to the accompanying drawings, in which:

FIG. 1b is an enlarged sectional view of the roller device shown in detail A of FIG. 1a;

FIG. 2a is a perspective view of one of the FIG. 1 wireline roller devices;

FIG. 2b is a front view of one of the FIG. 2a wireline roller device;

FIG. 3a is a detailed top view of a roller wheel of the FIG. 2a wireline roller device;

FIG. 3b is a detailed top view of a roller pin of said roller device;

FIG. 3c is a detailed top view of a main body of said roller device;

FIG. 3d is a detailed top view of a retaining bar of said roller device;

FIG. 5a is a top view of an assembly comprising the roller device and swivel assembly;

FIG. 5b is a longitudinal sectional view through line A-A of the FIG. 5a roller device and swivel assembly;

FIG. 5c is a side view of the FIG. 5a roller device and swivel assembly;

FIG. 5d is a longitudinal sectional view of the roller device and swivel assembly through line B-B of FIG. 5c;

FIG. 5e is a lateral sectional view of the roller device and swivel assembly at the central plane through line C-C of FIG. 5c;

FIG. 7a is a side view of one of the FIG. 6 sucker rod roller assemblies which comprises a plurality of rollers at different angulations around the rod;

FIG. 7b is an isometric view of the FIG. 7a roller rod;

FIG. 7c is an end view through line A-A of the FIG. 7a roller rod;

FIG. 7d is a lateral sectional view through line B-B of the FIG. 7a roller rod at the central plane of a first roller;

FIG. 7e is a lateral sectional view through line C-C of the FIG. 7a roller rod at a central plane of a second roller; and FIG. 7f is a lateral sectional view through line D-D of the FIG. 7a roller rod at a central plane of a third roller.

Figure 1A:
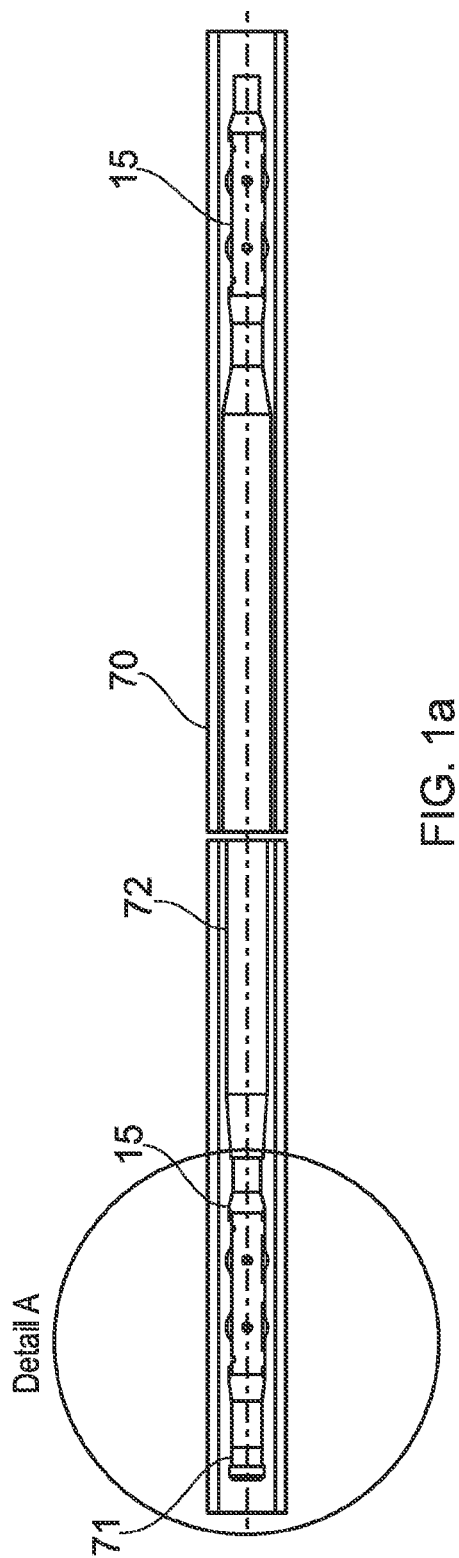
FIG. 1a is a sectional view of two wireline roller devices provided along a toolstring in a well tubing.

FIG. 1a shows two wireline roller devices 15 provided along a toolstring 72 in a section of tubing 70 in a deviated wellbore (not shown). As will be shown in more detail in FIG. 2a, each wireline roller device 15 has a main body 10, in which four roller wheels 20 are mounted on engagement members in the form of roller pins 40 which are in turn held in place by a hollow elongate retaining bar 31. A top sub 30 engages with the body 10 to hold the retaining bar in place in the body 10.

Two wireline roller devices 15 and a rope socket 71 (for connecting to wireline/coiled tubing for example, and hence connecting to a downhole well-intervention tool, not shown) can be provided on a toolstring 72 which is run into tubing 70 located in a deviated wellbore on an electric wireline (e-line, not shown) with a conductor cable passing through the hollow elongate retaining bar 31 for powering the well-intervention tool.

As the toolstring 72 is run into the wellbore on e-line, the roller wheels 20 of the roller devices 15 roll along a wall of the tubing 70 in the wellbore which can prevent any part of the toolstring 72 from inadvertently scraping, or getting lodged at, the deviated wall as the toolstring 72 is run into the well. The well-intervention tool is then operated.

Embodiments of the wireline roller device 15 that retain the roller pins 40 with the central retaining bar 31 are advantageous for a number of reasons. For example, they minimise the number of components and small parts required, which would otherwise necessitate a large inventory, and can potentially be lost in the wellbore. The assembly and servicing of the roller device 15 is thereby simplified, and its reliability improved.

FIG. 2a shows the wireline roller device 15 including the main body 10, and the four roller wheels 20 assembled therein. Each roller wheel 20 has a central through-hole 24 (as labelled and shown in more detail in FIG. 3a), and is rotatably disposed on a corresponding roller pin 40.

As labelled and shown in more detail in FIG. 3b, each roller pin 40 has a first, larger diameter portion 41, and a second, reduced diameter portion 42 which is at the outer end of each roller pin 40. There is a first lip 43 formed near the outer end of each roller pin 40 at the interface between the first 41 and second 42 diameter portions. The diameter of the roller wheel 20 through-hole 24 is larger than the first diameter portion 41 of the roller pin 40, which is where the roller wheel 20 is rotatably disposed.

As labelled and shown in more detail in FIG. 3c, the main body 10 has four countersunk roller pin bores 50 which have a first, larger diameter portion 51 at the inside of the main body 10 and a second, reduced diameter portion 52 at the outside of the main body 10. A second lip 53 is formed in each roller pin bore 50 at the interface between the first 51 and second diameter 52 pin bore 50 portions.

Due to the diameters of the roller pin bores 50 being complementary to the diameters of the roller pin 40, the roller pin 40 fits into the roller pin bore 50 in an interlocking manner, such that the first (roller pin) lip 43 rests against a second (roller pin bore) lip 53. The larger diameter portion 51 of each roller pin bore 50 is sized to receive the larger diameter portion 41 of the corresponding roller pin 40. Likewise, the reduced diameter portion 52 of each roller pin bore 50 is sized to receive the reduced diameter portion 42 of the corresponding roller pin 40, but not the larger diameter portion 41 of said roller pin 40.

The hollow elongate retaining bar 31 has a circular profile. An inner face 44 of each of the roller pins 40 is concave in shape so as to receive a complementary-shaped portion of the rounded retaining bar 31. The outside of the retaining bar 31 abuts the inner face 44 of each roller pin 40, exerting a compressive force which holds the roller pins 40 in place in the main body 10, with the first (roller pin) lips 43 being held against the second (roller pin bore) lips 53.

There are four wheel-openings 60 in the bottom of the main body 10, from each of which one of the four roller wheels 20 protrude past the outer wall of main body 10, as shown in FIG. 2b. The main body 10 has another opening on the opposite side, and the roller wheels 20 all protrude past the outer wall of main body 10 from this top opening also.

With reference to FIGS. 3c & 3d, the elongate retaining bar 31 extends through a body bore 19 in the main body 10, along the main body's central longitudinal axis. The retaining bar 31 has a central through-bore 33, which aligns with a central through-bore 11 of the main body 10.

The retaining bar 31 is itself retained in the main body 10 by a top sub 30 which threadably engages with a threaded outer surface of the first end 12 of the main body 10, such that it directly exerts a compressive force against the end 32 of the retaining bar 31. This compressive force holds the retaining bar 31 in place against a first inner seat 17, which is in the body bore 19 proximal the first end 12 of the main body 10, and also against a second inner seat 18, which is in the body bore 19 proximal a second end 13 of the main body 10.

Figure 4:
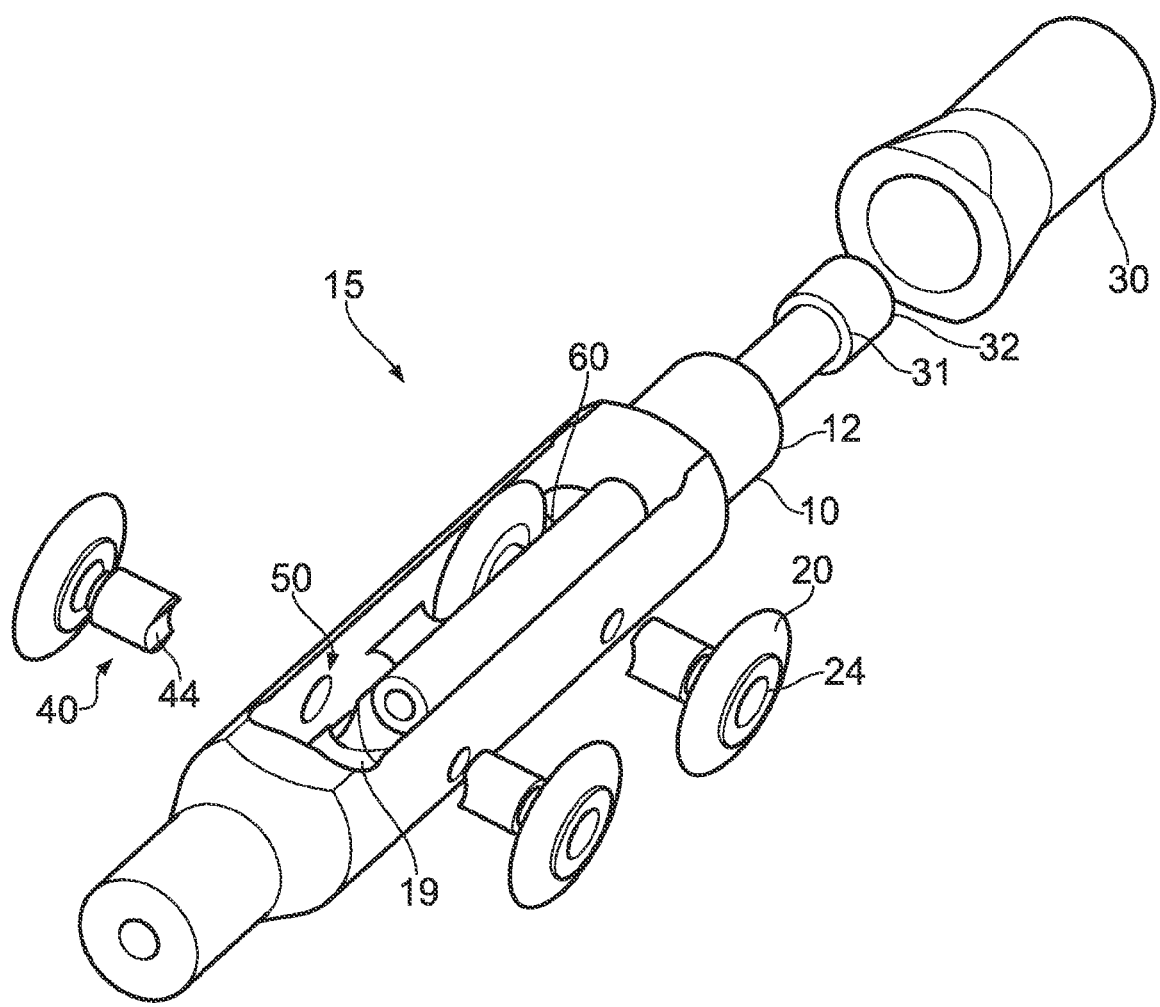
FIG. 4 is a partially-exploded perspective view of the FIG. 2a wireline roller device.

FIG. 4 shows a partially-exploded view of the wireline roller device 15 in which only one roller wheel 20 is shown assembled in the main body 10 with a roller pin 40.

For assembly of the wireline roller device 15, one roller wheel 20 is placed inside the main body 10, in one wheel-opening 60. Via the opening in the top of the main body 10, one roller pin 40 is inserted through the roller wheel through-hole 24, and it interlocks with the roller pin bore 50, with the roller pin lip 43 resting against the roller pin bore lip 53. This process is repeated, using the roller pins 40 to position all the roller wheels 20 in the main body 10.

The next step in the assembly is the insertion of the retaining bar 31. The retaining bar 31 is fed into the body bore 19 from the first end 12 of the main body 10, during which the inner face 44 of each of the roller pins 40 receives a portion of the outside of the retaining bar 31. The retaining bar 31 exerts a compressive force on the inner faces 44 holding the roller pins 40 in place in the main body 10, and thus retaining the roller pins 40 in place.

Once the retaining bar 31 has been positioned in the main body 10 as described above, the top sub 30 is then threadably engaged with the main body 10 at the main body's first end 12 (thread not shown), exerting a compressive force against the end 32 of the retaining bar 31. This compressive force holds the retaining bar 31 in place in the main body 10, which in turn holds the roller pins 40 in place. As such, the wireline roller device 15 is fully assembled.

An advantage of such embodiments of the invention is that the wireline roller device 15 has a minimal number of sealing threads and may be assembled without torque of a specific value required to be applied to each roller pin.

In further embodiments, the body bore 19 may be located along an off-centre longitudinal axis of the main body 10 which is parallel to the central longitudinal axis of the main body 10 of the wireline roller device 15. This arrangement may improve the strength of the assembly.

In further embodiments, the retaining bar 31 may have a rectangular or partially rectangular profile, instead of a circular profile. In such embodiments, the roller pins 40 are shaped so as to complement the retaining bar 31 and interlock with the outside of the retaining bar 31 upon assembly. This may result in a larger region of interface and a stronger connection between the retaining bar 31 and the roller pins 40.

In some embodiments, more than one retaining member may be used. For example, the retaining member could be composed of two distinct components, a first sub-retaining member and a second sub-retaining member, placed end-to-end within the roller body 10. The functionality of the retaining member composed of the plurality of sub-retaining members is substantially similar to the functionality of the single retaining member 31 embodiment as described herein elsewhere.

The e-line is typically held at surface and deployed in the well, and particularly the reaction of the wheels against an outer casing or wellbore can twist the e-line. Accordingly, certain embodiments include a swivel functionally in order to allow the roller body to rotate along the main longitudinal axis of the device, mitigating or preventing twisting of the e-line. FIGS. 5a-5e show a roller device swivel assembly 80 comprising the roller device 15 and a swivel assembly 80 to allow the roller body 10 to rotate with respect to an e-line conductor 75.

The roller body 10 interfaces at each end with a rotatably disposed swivel pin 81. Each end of the roller body 10 and the respective swivel pin 81, are connected by a respective swivel housing in the form of an elongated cap 82, which rotatably connects over the respective swivel pin 81 and rigidly connects over the respective end of the roller body 10 via a thread.

Each swivel pin 81 has a bore 89 therethrough. The swivel pin bore 89 is formed such that an extended hollow retaining bar 31a can pass through each swivel pin 81. The e-line 75 passes through the hollow retaining bar 31a as described above for earlier embodiments.

With reference to FIG. 5b especially, each swivel pin 81 has a shaft portion 85 and a head portion 83 which interfaces with the end of the roller body 10. The head portion 83 is larger in diameter than the shaft portion 85, forming a step 86 between the respective portions 83, 85.

The elongated cap 82 has a complementary inner profile so as to engage with the swivel pin 81, its step 86 and the roller body 10.

To facilitate relative rotation between the ends of the roller body 10 and the swivel pins 81, a small tolerance is left between the end of the roller body 10 and the interfacing head portion end 83 of the swivel pin 81. Similar tolerance is provided between the elongated cap 82 and the swivel pin 81. The resulting cavities are filled with hydraulic fluid, thereby mitigating any frictional forces acting against the relative rotational movement of the roller body 10 and elongated cap 82 with respect to the swivel pin 81, and hollow retaining bar 31a.

When the roller device swivel assembly 80 is assembled, the swivel pin 81 is received in the elongated cap 82. The elongated cap 82 is affixed to the roller body 10 by a threaded connection such that relative movement between the roller body 10 and the elongated cap 82 is prevented during normal use. In contrast, the swivel pin 81 is rotatably held to the roller body 10 by the elongated cap 82, such that the swivel pin bore 89 is kept substantially aligned with the bore 19 through the roller body 10. This provides a continuous path through the roller device swivel assembly 80 through which the retaining bar 31 and the e-line 75 pass.

Figure 1B:
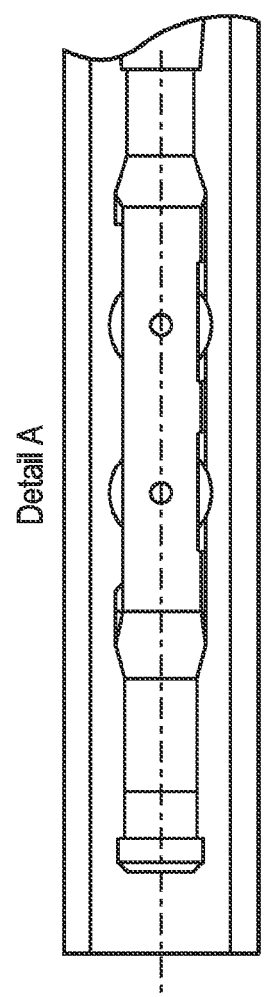

An outer end 84 of the swivel pin 81 extends past the elongated cap 82. The outer end 84 of each swivel pin 81 is affixed to a cross-over coupling (not shown) located at either end of the roller device swivel assembly 80. Each cross-over coupling is provided for connection with a portion of the toolstring 72 which is partially shown in FIG. 1. Alternatively, one of the swivel pins 81 can be connected directly to a well-intervention tool 71 (shown in FIG. 1), depending on the location of the roller device 15 along the toolstring 72. The roller device swivel assembly 80 is run into the tubing 70 (see FIG. 1) on the e-line 75.

FIGS. 5c to 5e show alternative views of the FIGS. 5a to 5b embodiment.

Figure 6:
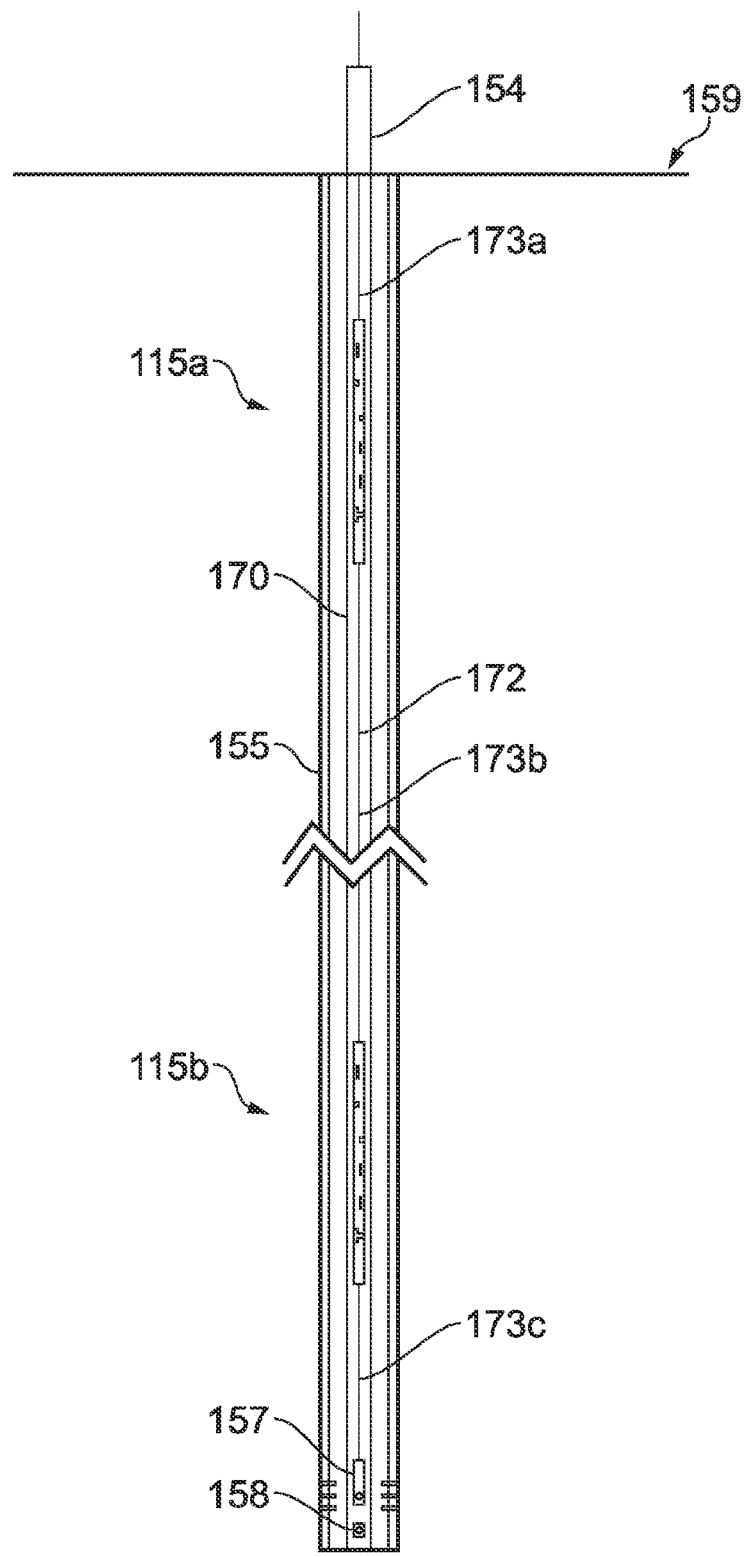
FIG. 6 is a sectional view of a well bore in which two sucker rod roller assemblies are used as centralisers.

The above embodiments are exemplified for use with wireline. However embodiments of the present invention can also be used with a reciprocating pump rod in a well. FIG. 6 shows an alternative embodiment in which two centraliser roller assemblies 115 are disposed along a sucker rod string 172 in a well bore 155. The centraliser roller assembly 115 is used to centralise the sucker rod string of a reciprocating piston pump for an oil well (not shown), also known as a donkey pump or nodding donkey. Therefore, any damage to the roller rod 110 and sucker rod string caused by their scraping along a wall of the well bore is reduced. FIGS. 6 & 7a-7f include like parts with the embodiment of the earlier Figs. and these are not described again in detail. The reference numerals of the like parts share the same latter two digits in both embodiments, but differ in that they are prefixed with a '1' in this second embodiment.

A primary centraliser roller assembly 115a is disposed on the string 172 near the surface 159 of the well 155, and a secondary centraliser roller assembly 115b is disposed further down the string 172 in a deeper location in the well 155. The string 172 is composed of multiple sucker rod portions 173a, 173b, 173c.

At the end of the string 172 is a standard travelling valve/plunger 157. A check valve 158 is located at the bottom of the well 155. The travelling valve/plunger 157 and the check valve 158 are positioned near the well perforations. All of the centraliser roller assemblies 115 on the string 172 are positioned between a well head 154 at the surface of the well 159 and the travelling valve 157.

In embodiments, additional centraliser roller assemblies 115 are disposed on the string 172. FIGS. 7a-7f show a centraliser roller assembly 115 of the FIG. 6 embodiment in more detail. In FIGS. 7a-7f, the centraliser roller assembly 115 comprises a plurality of roller wheels 120a-120f at different angulations around a body of a sucker rod roller device, i.e. roller rod 110.

The roller rod 110 is directly connected at either end to a standard sucker rod (not shown in this Figure) forming a sucker rod string. Only some of the roller wheels 120a-120f actively roll along the wall of the well bore at any one time, thus reducing the overall load of each wheel 120a-120f.

The mode of connection between the roller rod 110 and each adjacent sucker rod is of the pin-and-box type. The roller rod 110 is shown as having a box (female) connection 156 in FIG. 7b, but a pin (male) connection could alternatively be used.

There are six roller wheels 120a-120f longitudinally spaced along the roller rod 110, forming three longitudinally spaced apart pairs, as shown in FIGS. 7a and 7b. The pairs of wheels are located at one of three roller planes 121, 122, 123 offset from each other by 120 degrees, as shown in FIG. 7c. The pairs of roller wheels and are separated longitudinally and by an angle of 120 degrees such that on each plane 121, 122, 123 there is a pair of roller wheels. Roller wheels 120a and 120d are on plane 121; 120b and 120e are on plane 122; and 120c and 120f are on plane 123.

Each roller wheel 120a-120f is retained with a roller pin 140a-140f, in a similar manner as with the embodiment of the earlier FIGS. 1 to 5. Roller pins 140a-140c are shown to retain the roller wheels 120a-120c respectively in FIGS. 7d to 7f. Roller pins 140d-140f are not shown.

All the roller pins 140d-140f are retained by the use of a retaining bar 131, in a similar manner as with the embodiment of the earlier FIGS. 1 to 5. However, in the present embodiment, the retaining bar 131 need not be hollow. The retaining bar 131 is itself retained in the roller rod 110 through abutment with the sucker rods connected at either side of the roller rod 110 in the sucker rod string (not shown). Therefore, the adjacent sucker rods directly exert a compressive force against the ends of the retaining bar 131, and indirectly retain the roller wheels 120a-120f.

As illustrated more clearly in FIG. 7d, the axis of rotation of the wheel 120a is off-centre and sized such that a first portion 91 of the outer circumference of the wheel extends radially outside of the body 110 and a second portion 92 of the outer circumference of the wheel is within the body 110. Also, the outer rim of the wheels 93 is tapered in the direction of the circular cross-section of the body. This allows for more surface connection with an outer casing or well in use. (Ideally the outer rim 93 is arcuate in shape, although a straight taper in the direction of the circular cross-section of the body provides improved functionality over a right angled rim i.e. without any taper.) In this embodiment, the wheels 120a-f are all configured in this way.

The reciprocating pump operates with alternating downstrokes and upstrokes. During a downstroke of the reciprocating pump, the sucker rod string including the centraliser roller assembly 115 is placed under compression and typically experiences a mode of buckling. Therefore, only one wheel 120a-120f per plane 121, 122, 123 would typically operate by contacting with a side of the wellbore (not shown). During an upstroke of the reciprocating pump, the sucker rod string including the centraliser roller assembly 115 is placed under tension, which typically results in an opposite mode of buckling. In this scenario, each roller wheel 120a-120f will be operational and under load either during the upstroke or the downstroke of the pump, and not during both the upstroke and downstroke as with some conventional pumps.

An advantage of such embodiments of the present invention is the reduction (e.g. halving) of the load on each roller wheel 120a-120f and thus a superior life span of the centraliser roller assembly 115, e.g. beyond around two years without servicing. A further advantage of such embodiments of the present invention is that the pump stroke can be maintained for longer, and/or longer lengths of sucker rod may be used, allowing the reciprocating pump to be used in deeper wells.

In alternative embodiments, the roller planes can be offset from each other at an angle less than or greater than 120 degrees. In particular, if the roller planes are separated from each other by an angle less than 120 degrees, further roller planes and pairs of roller wheels can be included. For example, four pairs of wheels could be disposed around the roller rod separated by an angle of 90 degrees. As further examples, eight pairs of the wheels could be disposed at 45 degrees apart, or six pairs of wheels could be disposed at 60 degrees apart. Still alternatively, a single roller plane could be used, with one or more roller wheels disposed along said plane.

The skilled person would appreciate that different dimensions could be used for the components of the centraliser roller assembly 115. In particular, the diameter of the roller rod 110 depends on the well bore size. However, in this example, the diameter of the roller rod 110 is between ⅝ths of an inch (apprx. 1.6 cm) and 1⅛ inches (apprx. 2.9 cm). Furthermore, in this example, the length of the roller rod 110 is 12 inches (30 cm).

In some embodiments, the swivel mechanism as in FIG. 5 herein described is used in conjunction with the centraliser roller assembly. A swivel mechanism is located at one or both ends of the roller rod. An elongated cap is affixed to the at least one end of the roller rod, and a swivel pin is located at that end and partially encased by the elongated cap. This allows relative movement of the roller rod with respect to the adjacent sucker rod or rods, in a similar manner as with the previously described embodiment.

The above embodiments are used to retain wheels. In alternative embodiments, other components are retained in the roller body of the previously described embodiment such as measuring equipment and/or sensors and/or cutters. An advantage of such embodiments include that the usage of screws and traditional fasteners is reduced.

The invention claimed is:

1. A downhole device comprising:
a body with a bore;
at least one retained component;
an engagement member for engaging the at least one retained component with the body, the engagement member having a main axis;
a retaining member for retaining the engagement member, the retaining member being moveable from a release position to a retaining position, wherein the retaining member is a retaining bar;
wherein in the retaining position, the retaining member is provided in line with said axis, such that the engagement member abuts with the retaining member so that it obstructs and resists movement of the engagement member along the axis, and wherein in the retaining position, the retaining member extends through the body bore along a longitudinal axis of the body.

2. The downhole device as claimed in claim 1, wherein the retaining member is at an angle of 50 to 130 degrees with respect to the main axis of the engagement member.

3. The downhole device as claimed in claim 1, wherein the at least one retained component comprises at least one of a wheel, cutter, sensor and a gauge.

4. The downhole device as claimed in claim 3, wherein the retained component comprises at least one wheel which extends at least in part radially outside of the body.

5. The roller device of claim 4, wherein an outer rim of the wheel is tapered in the direction of the outer circumference of the body.

6. The downhole device of claim 1 wherein there are at least two wheels.

7. The downhole device of claim 6, wherein the at least two wheels are angularly spaced apart from each other by at least 25 degrees.

8. The downhole device of claim 1, wherein there is a locking mechanism provided to lock the retaining member in the retaining position.

9. The downhole device of claim 8 wherein the locking mechanism comprises a locking sub threadably engaged on an end of the body.

10. The downhole device of claim 1, wherein a first end of the engagement member abuts with the retaining member and is shaped complimentarily with an outer face of the retaining member so as to engage with the outer face thereof.

11. The downhole device of claim 10 wherein the engagement member has a second end opposite its first end, the second end of the engagement member engaging with a complementary socket provided in the body.

12. The downhole device as claimed in claim 1, further comprising at least one of a logging tool, completion tool and a perforating gun.

13. The downhole device of claim 1 configured to be run into a borehole on a rod.

14. A downhole device comprising:

a body with a bore;

at least one wheel;

an engagement member for engaging the at least one retained component with the body, the engagement member having a main axis;

a retaining member for retaining the engagement member, the retaining member being moveable from a release position to a retaining position, wherein the retaining member is a retaining bar;

wherein in the retaining position, the retaining member is provided in line with said axis, such that the engagement member abuts with the retaining member so that it obstructs and resists movement of the engagement member along the axis, and wherein in the retaining position, the retaining member extends through the body bore; and wherein the at least one wheel extends at least in part radially outside of the body; and wherein the axis of rotation of the at least one wheel is off-centre in the body, such that a first portion of the outer circumference of the wheel extends radially outside of the body and a second portion of the outer circumference of the wheel is within the body.

15. A downhole device comprising:

a body with a bore;

at least one retained component;

an engagement member for engaging the at least one retained component with the body, the engagement member having a main axis;

a retaining member for retaining the engagement member, the retaining member being moveable from a release position to a retaining position, wherein the retaining member is a retaining bar;

wherein in the retaining position, the retaining member is provided in line with said axis, such that the engagement member abuts with the retaining member so that it obstructs and resists movement of the engagement member along the axis, and wherein in the retaining position, the retaining member extends through the body bore;

and wherein the body is rotatably disposed with respect to the retaining member.

16. A downhole device comprising:

a body with a bore;

at least one retained component;

an engagement member for engaging the at least one retained component with the body, the engagement member having a main axis;

a retaining member for retaining the engagement member, the retaining member being moveable from a release position to a retaining position, wherein the retaining member is a retaining bar;

wherein in the retaining position, the retaining member is provided in line with said axis, such that the engagement member abuts with the retaining member so that it obstructs and resists movement of the engagement member along the axis, and wherein in the retaining position, the retaining member extends through the body bore;

and wherein the engagement member comprises a pin.

17. The downhole device as claimed in claim 16, wherein the retained component comprises a wheel.

18. A downhole device comprising:

a body with a bore;

at least one retained component;

an engagement member for engaging the at least one retained component with the body, the engagement member having a main axis;

a retaining member for retaining the engagement member, the retaining member being moveable from a release position to a retaining position, wherein the retaining member is a retaining bar; wherein in the retaining position, the retaining member is provided in line with said axis, such that the engagement member abuts with the retaining member so that it obstructs and resists movement of the engagement member along the axis, and wherein in the retaining position, the retaining member extends through the body bore; and of claim 10 wherein a first end of the engagement member abuts with the retaining member and is shaped complimentarily with an outer face of the retaining member so as to engage with the outer face thereof, wherein the first end of the engagement member is concave-shaped and the retaining member is cylindrical.

19. A downhole device comprising:

a body with a bore;

at least one retained component;

an engagement member for engaging the at least one retained component with the body, the engagement member having a main axis;

a retaining member for retaining the engagement member, the retaining member being moveable from a release position to a retaining position, wherein the retaining member is a retaining bar;

wherein in the retaining position, the retaining member is provided in line with said axis, such that the engagement member abuts with the retaining member so that it obstructs and resists movement of the engagement member along the axis, and wherein in the retaining position, the retaining member extends through the body bore;

and wherein the engagement member mounts each retained component between the retaining member and the body.

20. A downhole device comprising:

a body with a bore;

at least one retained component;

an engagement member for engaging the at least one retained component with the body, the engagement member having a main axis;

a retaining member for retaining the engagement member, the retaining member being moveable from a release position to a retaining position, wherein the retaining member is a retaining bar;

wherein in the retaining position, the retaining member is provided in line with said axis, such that the engagement member abuts with the retaining member so that it obstructs and resists movement of the engagement member along the axis, and wherein in the retaining position, the retaining member extends through the body bore;

and wherein the retaining member has a throughbore such that in use wireline may extend therethrough.

21. A method of deploying into an oil and gas well a downhole device comprising:
- a body with a bore;
- at least one retained component;
- an engagement member for engaging the at least one retained component with the body, the engagement member having a main axis;
- a retaining member for retaining the engagement member, the retaining member being moveable from a release position to a retaining position, wherein the retaining member is a retaining bar;
- wherein in the retaining position, the retaining member is provided in line with said axis, such that the engagement member abuts with the retaining member so that it obstructs and resists movement of the engagement member along the axis, and
- wherein in the retaining position, the retaining member extends through the body bore along a longitudinal axis of the body;

the method comprising the steps of
providing the downhole device as part of a toolstring; and
running the toolstring into the oil and gas wellbore on wireline.

22. A method of deploying into an oil and gas well a downhole device comprising:
- a body with a bore;
- at least one retained component;
- an engagement member for engaging the at least one retained component with the body, the engagement member having a main axis;
- a retaining member for retaining the engagement member, the retaining member being moveable from a release position to a retaining position, wherein the retaining member is a retaining bar;
- wherein in the retaining position, the retaining member is provided in line with said axis, such that the engagement member abuts with the retaining member so that it obstructs and resists movement of the engagement member along the axis, and
- wherein in the retaining position, the retaining member extends through the body bore along a longitudinal axis of the body;

the method comprising the steps of:
- providing the downhole device as part of a reciprocating rod string; and
- deploying the reciprocating rod sting into the oil and gas wellbore.

* * * * *